United States Patent
Bechhoefer (10) Patent No.: US 9,778,281 B1
(45) Date of Patent: Oct. 3, 2017

(54) TACHOMETER SIGNAL JITTER REDUCTION SYSTEM AND METHOD

(71) Applicant: Eric Robert Bechhoefer, Cornwall, VT (US)

(72) Inventor: Eric Robert Bechhoefer, Cornwall, VT (US)

(73) Assignee: Green Power Monitoring Systems, Inc., Cornwall, VT (US)

( * ) Notice: Subject to any disclaimer, the term of this patent is extended or adjusted under 35 U.S.C. 154(b) by 0 days.

(21) Appl. No.: 15/293,188

(22) Filed: Oct. 13, 2016

Related U.S. Application Data (60) Provisional application No. 62/241,186, filed on Oct. 14, 2015.

(51) Int. Cl.
*G01P 21/02* (2006.01)
*G01P 3/00* (2006.01)
*G01M 1/16* (2006.01)

(52) U.S. Cl.
CPC ............. *G01P 21/02* (2013.01); *G01M 1/16* (2013.01)

(58) Field of Classification Search
USPC ...... 73/146, 594, 455, 170.01, 1.37; 702/56; 701/3
See application file for complete search history.

(56) References Cited

U.S. PATENT DOCUMENTS

| | | | | |
|---|---|---|---|---|
| 2,947,983 A | * | 8/1960 | Whitfield | G01S 1/02 340/943 |
| 2,983,144 A | * | 5/1961 | Moses | G01P 13/02 73/170.01 |
| 3,353,404 A | * | 11/1967 | Swift | G01C 7/04 73/146 |
| 3,427,877 A | * | 2/1969 | Carpenter | G01N 3/34 73/146 |
| 7,512,463 B1 | * | 3/2009 | Bechhoefer | G05B 5/01 701/3 |
| 2011/0191040 A1 | * | 8/2011 | Bechhoefer | B64C 27/008 702/56 |

OTHER PUBLICATIONS

Bechhoefer, et al., "Initial Condition Monitoring Experience on a Wind Turbine," Annual Conference of the Prognostics and Health Management Society, 2012.

(Continued)

*Primary Examiner* — Jewel V Thompson
(74) *Attorney, Agent, or Firm* — Justin McCabe; Dunkiel Saunders Elliot Raubvogel Hand (57) ABSTRACT

Assessing and removing jitter from tachometer signals enhances the performance of condition monitoring systems where accurate tachometer signals are needed. A system as disclosed herein can be designed and configured to have a low order of operations, so as to allow for implementation on low cost microcontrollers, which can be important for bused, distributed monitoring systems in which the tachometer zero crossing data is collected at a tachometer sensor and then broadcast to other remote sensors needing that information for vibration or other advanced analysis. Moreover, for monolithic architecture systems (e.g., a centralized processing and control architecture), the low order of operation and small software code base allows the system to be a simple/low cost addition to existing monitoring systems.

12 Claims, 8 Drawing Sheets

(56) References Cited

OTHER PUBLICATIONS

Bechhoefer, et al., "Processing for Improved Spectral Analysis," Annual Conference of the Prognostics and Health Management Society, 2013.

Bechhoefer, et al., "Signal Processing Techniques to Improve an Acoustic Emissions Sensor," Annual Conference Df the Prognostics and Health Management Society, 2013.

McFadden, et al., "A revised model for the extraction of periodic waveforms by time domain averaging," Mechanical Systems and Signal Processing 1 (1), 83-95, 1987.

Zakrajsek, et al., "An Analysis of Gear Fault Detection Methods as Applied to Pitting Fatigue Failure Data," NASA Technical Memorandum 105950, 1993.

* cited by examiner

TACHOMETER SIGNAL JITTER REDUCTION SYSTEM AND METHOD

CROSS-REFERENCE TO RELATED APPLICATIONS

This application claims priority to U.S. Provisional Patent Application No. 62/241,186, filed Oct. 14, 2016 and titled "Tachometer Signal Jitter Reduction System and Method" which is hereby incorporated by reference in its entirety.

FIELD OF INVENTION

The present invention generally relates to rotating equipment condition monitoring. In particular, the present invention is directed to a tachometer signal jitter reduction system and method of reducing tachometer signal jitter.

BACKGROUND OF THE INVENTION

Diagnostics of rotating components are a maturing field and the tachometer plays an important role in the quality of vibration based diagnostics. Various studies have disclosed a number of analysis techniques, such as synchronous analyses (primarily for shafts and gears) and non-synchronous analyses (primarily for bearings). Synchronous analyses are typically based on the time synchronous average (TSA) so as to eliminate signal components that are not synchronous with the rate of rotation of the shaft or gear, whereas non-synchronous analysis generally uses some type of demodulation and enveloping, returning energy associated with the fault frequency of the item under analysis (e.g., bearing).

Synchronous analyses of vibration signals relating to rotating equipment have used the Fourier transform or the Fast Fourier transform (FFT) (the latter being more typically employed for processing efficiencies) to provide vibration based diagnostics by measuring the magnitude and phase of vibration of components under observation (such as shafts, gears or bearings), which can be indicative of wear and failure. When using the FFT, typically one assumes that the signal under analysis is infinite in time; however, this assumption fails for real signals and a common mitigation technique is the use of a window function, such as the Hamming window (general form:

$$w(n) = \alpha - \beta \cos\left(\frac{2\pi n}{N-1}\right)).$$

Another common assumption is that the vibration signal is stationary; however, as all rotating machines vary in their rotational rate due to changing load conditions and the limits of the feedback control bandwidth, this assumption of stationarity also commonly fails.

Figure 1:
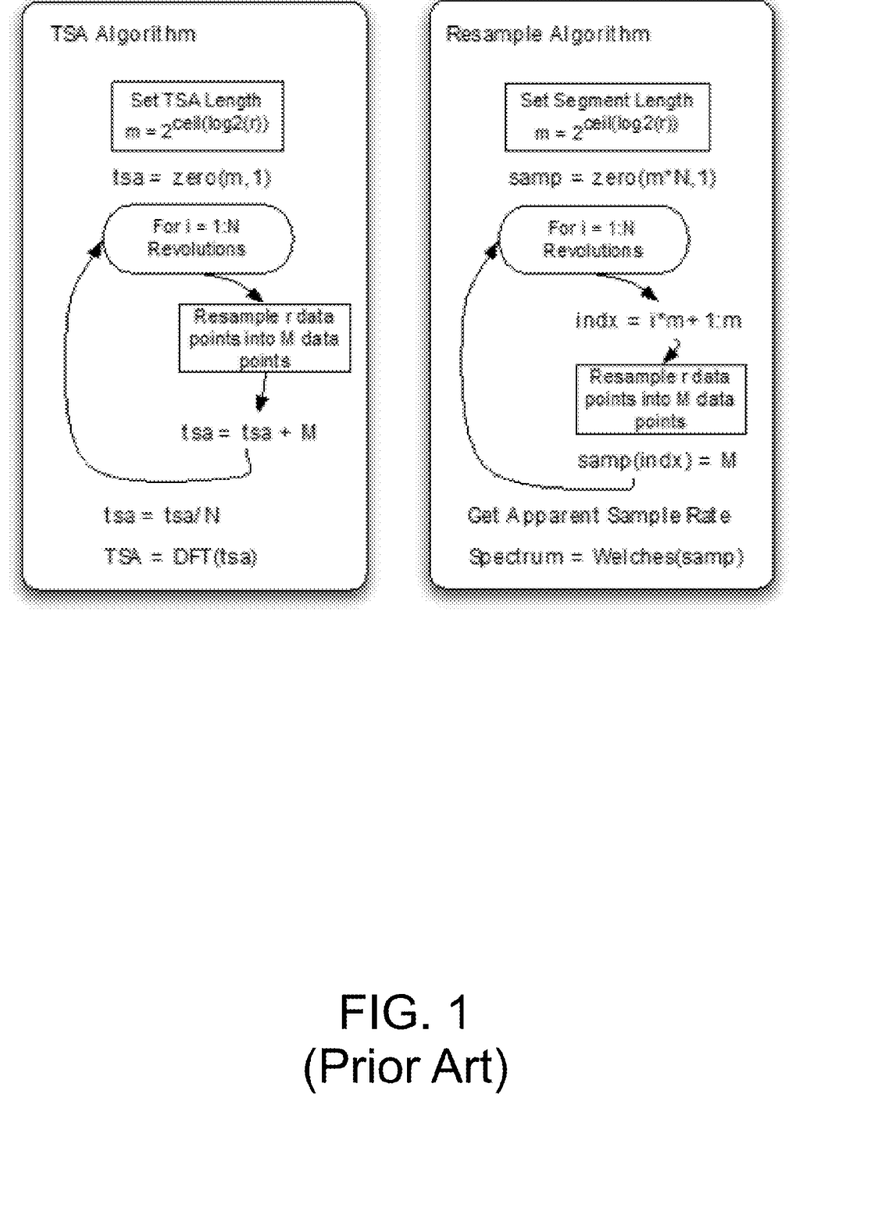
FIG. 1 shows exemplary diagrams of TSA and TSR according to embodiments of the present invention.

In practice, the lack of stationarity results in "spectral smearing" of energy associated with a shaft, which in turn results in inaccurate measuring of the energy associated with a particular fault frequency. To improve the performance of vibration analysis using the FFT, Time Synchronous Averaging (the TSA, for shaft/gear analysis) and Time Synchronous Resampling (TSR) have been developed. Examples of TSA and TSR systems are shown in FIG. 1.

At a high level, the TSA resamples the vibration associated with a shaft or gear in the spatial domain such that vibration associated with each shaft order in the Fourier domain represents one frequency bin. For example, the gear mesh energy of a 37 tooth gear on a given shaft is found in the Fourier domain to be bin 38, and the second harmonic of that gear would be in bin 75 (37×2+1, (bin 1 is the DC energy)). The TSA also reduces non-synchronous vibration by 1√(rev), where rev is the total number of shaft revolutions that constructed the TSA.

The TSR resamples (e.g., upsamples) the vibration to correct for variation in shaft speed. The apparent sample rate is the ratio of the total resampled time domain, i.e., vibration data set length divided by original data set length, multiplied by the original sample rate.

TSA and TSR typically use a tachometer signal to calculate the time over which a shaft completes one revolution. As is generally known, the time taken for any shaft to complete a rotation can be calculated even if the tachometer is not associated with a given shaft. This can be calculated, for example, by taking into account the shaft ratio between the shaft with a tachometer to the shaft under analysis, then interpolating based on the known tachometer signal.

The type of tachometer signal is dependent on the sensor type. Types of sensors typically used include, but are not limited to: 1) a Hall sensor, where there is a rising voltage associated with the passing of a ferrous target (such as a gear tooth) in front of the sensor; 2) an inductive sensor, where there is a rising voltage associated with the passing of any metallic target (such as an aluminum shaft coupling); 3) an optical sensor, where there is a rising voltage associated with the receiving of light from a reflective target on the shaft; or 4) a generator or variable reluctance sensor, where the frequency and amplitude of a sinusoidal signal is proportional to target (usually a gear) RPM, and the time of the zero crossing is taken at the transition of the sinusoid from negative to positive voltage.

An incorrect tachometer signal reduces the effectiveness of the TSA and TSR to reduce spectral smearing, which negatively affects the ability of the vibration analysis to detect component faults. While important to all frequency signatures, the impacts are more apparent to higher frequency signatures and higher harmonics, which are often present with a fault.

SUMMARY OF THE DISCLOSURE

In an exemplary aspect, a system of monitoring a rotating component is disclosed, the system comprising: a tachometer sensor coupled to the rotating component so as to produce a tachometer signal representative of the speed of rotation of the rotating component; a controller electronically coupled to the tachometer so as to receive the tachometer signal, the control system including a processor and a set of instructions, the set of instructions including: determining an effect of jitter on the tachometer signal; and removing the amount of jitter from the tachometer signal using a filter.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DESCRIPTION OF THE DISCLOSURE

A tachometer signal jitter reduction system (hereinafter, the "system") and method according to the present disclosure enhances the performance of condition monitoring systems where accurate tachometer signals are needed. The system is designed and configured to have a low order of operations, so as to allow for implementation on low cost microcontrollers, which can be important for bused, distributed monitoring systems, in which the tachometer zero crossing data is collected at a tachometer sensor and then broadcast to other remote sensors needing that information for vibration or other advanced analysis. Moreover, for monolithic architecture systems (e.g., a centralized processing and control architecture), the low order of operation and small software code base allows the system to be a simple/low cost addition to existing monitoring systems.

Advantageously, for systems that employ advanced vibration diagnostics using TSA or TSR, the system has zero phase lag such that the system does not impact any analysis which needs phase information, such as shaft/rotor balancing. In exemplary embodiments, the system provides tachometer jitter reduction and analyses with a corresponding improvement in fault discrimination and separability. In one example, about a 26% increase in separability (the normalized statistical distance between a nominal and damage component) was observed on a real world fault. Moreover, uses of the system that improve separability can lead to earlier fault detection for a given probability of false alarm.

Figure 2:
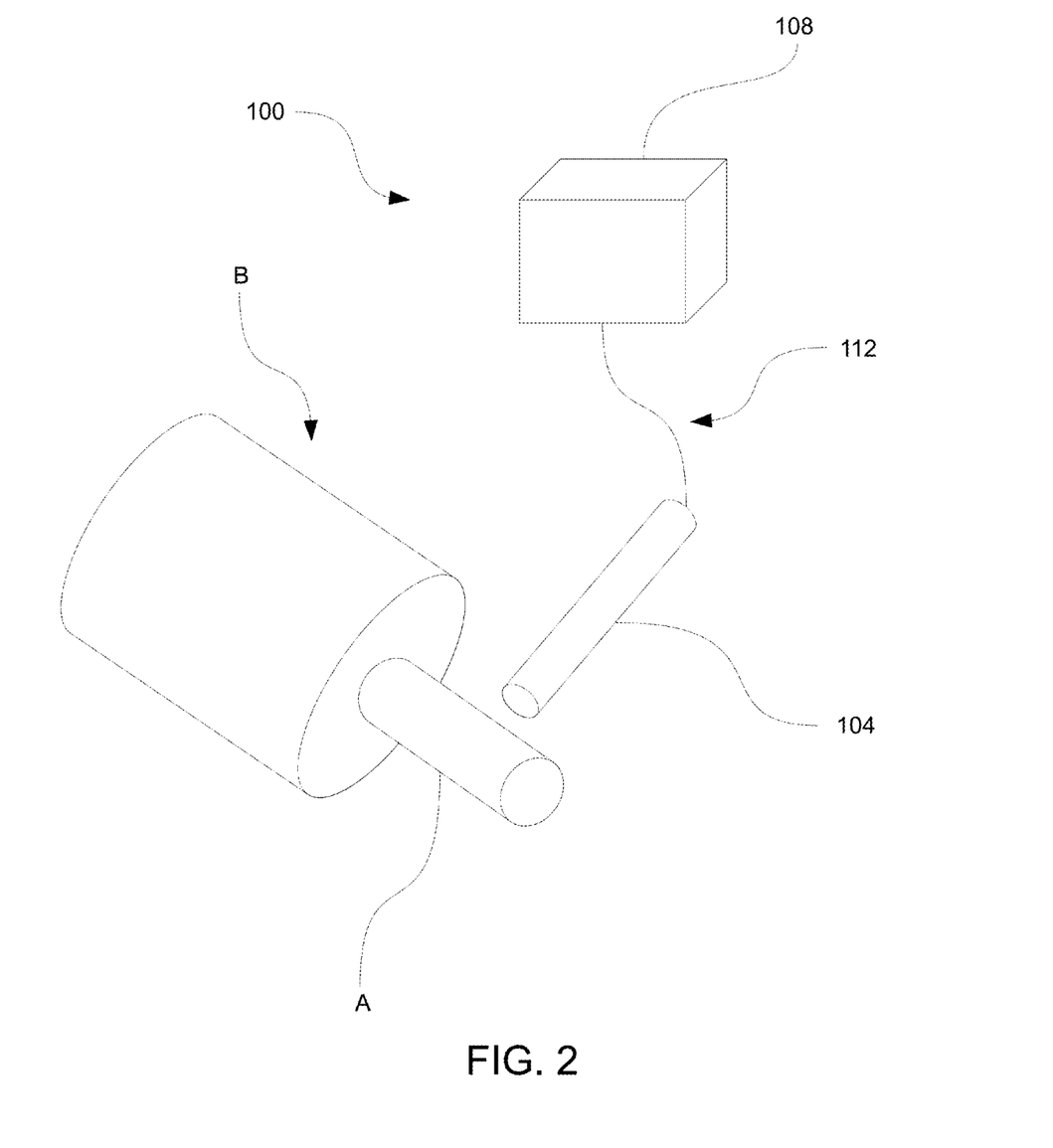
FIG. 2 is a block diagram of a tachometer signal jitter reduction system according to an embodiment of the present invention.

At a high level, and as shown in FIG. 2, a system 100 includes a tachometer sensor 104 in electronic communication with a controller 108 via a communication link 112 (which may be a wired or wireless connection). Tachometer sensor 104 monitors the shaft speed of a rotating shaft, A (shown in FIG. 2 as the shaft of a motor, B). Controller 108 includes, among other things, a processor and a storage (not shown), and uses various techniques (discussed in more detail below) to for remove jitter from the resulting signal received from tachometer sensor 104.

Tachometer sensor 104 can be, but is not limited to: 1) a Hall sensor, where there is a rising voltage associated with the passing of a ferrous target (such as a gear tooth) in front of the sensor; 2) an inductive sensor, where there is a rising voltage associated with the passing of any metallic target (such as an aluminum shaft coupling); 3) an optical sensor, where there is a rising voltage associated with the receiving of light from a reflective target on the shaft; or 4) a generator or variable reluctance sensor, where the frequency and amplitude of a sinusoidal signal is proportional to a target (usually a gear) RPM, and the time of the zero crossing is taken at the transition of the sinusoid from negative to positive voltage.

Before discussing an exemplary method of operating system 100, a general overview of vibration monitoring is presented. In general, vibration signals can be analyzed using amplitude and phase as a function of frequency. In conducting these analyses, understanding the tachometer phase is important for vibration monitoring as this information can highlight synchronous signals associated with a fault/imbalance condition of the component under observation and thus provide information to the operator or maintenance personnel about the state of components.

A model for vibration in a shaft in a gear box can be as shown in Equation 1:

$$x(t)=\Sigma_{i=1}^{k}X_i(1+a_i(t))\cos(2\pi i f_m(t)+\Phi_i)+b(t) \quad (\text{Eq. 1})$$

Where:
$X_i$ is the amplitude of the kth mesh harmonic;
$f_m(t)$ is the average mesh frequency;
$a_i(t)$ is the amplitude modulation function of the kth mesh harmonic;
$\Phi_i$ is the initial phase of harmonic k; and
$b(t)$ is additive background noise.

The mesh frequency is a function of the shaft rotational speed: $f_m=Nf$, where N is the number of teeth on the gear and f is the shaft speed. The vibration model of Equation 1 (above) assumes that f is constant. However, because of bandwidth limitations in the feedback control and time varying loads, there is some wander in the shaft speed f. As a result of the changes in shaft speed, there is smearing of amplitude energy in the frequency domain (the "smearing effect"). This smearing effect, and concomitantly, non-synchronous noise, is typically reduced by resampling the time domain signal into the angular domain as shown in Equation 2:

$$m_x(\theta)=E[x(\theta)]=m_x(\theta+\Phi) \quad (\text{Eq. 2})$$

The variable $\Phi$ is the period of the cycle of the shaft under analysis, and it referenced by the tachometer sensor 104's zero crossing time. If the tachometer signal from tachometer sensor 104 is the true reference, the $m_x(\theta)$ is stationary and ergodic. Further, the non-synchronous noise is reduced by $1/\sqrt{\text{rev}}$, where rev is the number of cycles measured for the Time Synchronous Averaging (TSA).

However, an incorrect tachometer signal from tachometer sensor 104 will reduce the effectiveness of the TSA. An error in the tachometer signal, such as jitter, causes an error in $\Phi$, which (especially for large N (e.g. gear mesh)) causes the TSA to be non-ergodic and can negatively affect the ability of component monitoring systems to detect component faults.

Figure 3:
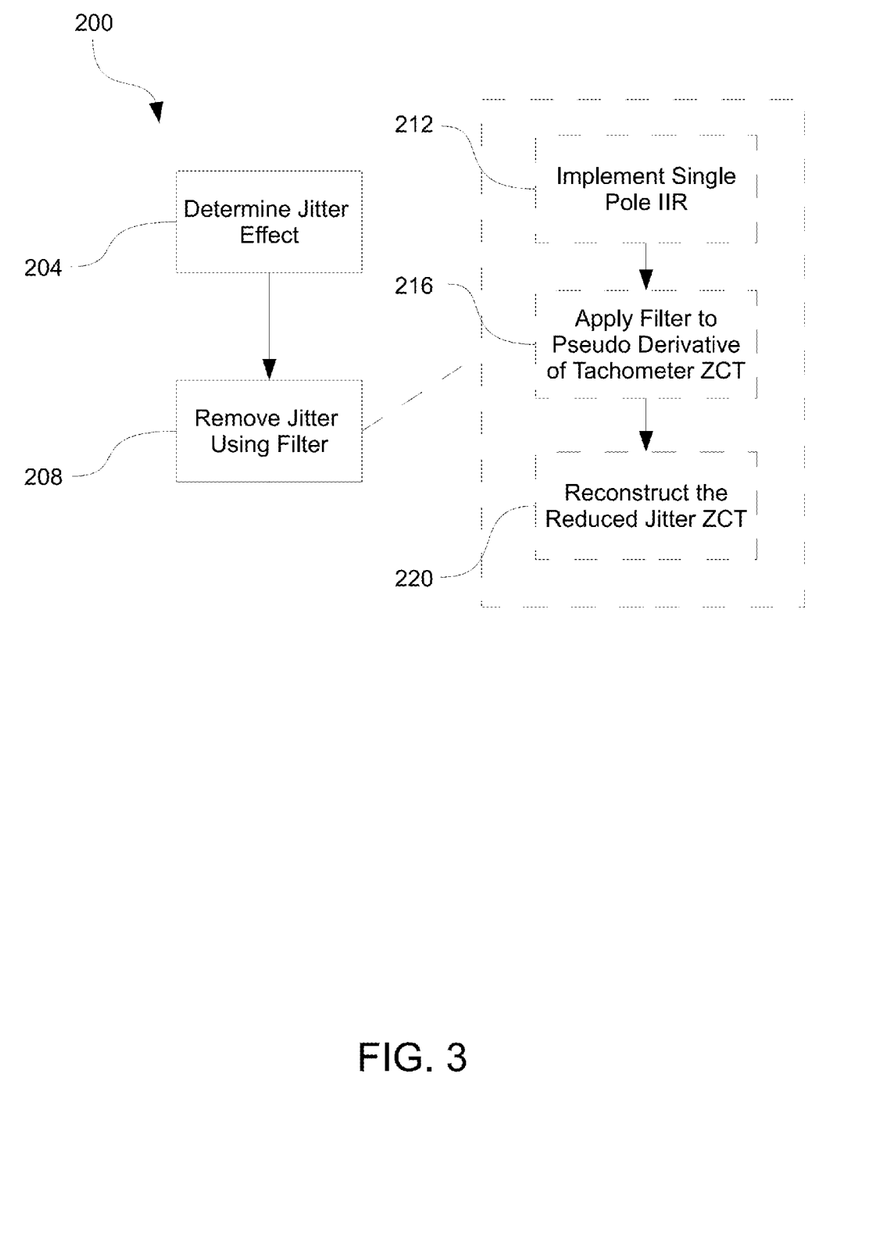
FIG. 3 is a process diagram of a process of reducing tachometer signal jitter according to an embodiment of the present invention.

Controller 108 can use a jitter removal process, such as jitter removal process 200 shown in FIG. 3, so as to determine the amount of jitter and to remove the jitter for subsequent analyses. The jitter can be determined at step 204 using the tachometer signal's zero crossing time (ZCT). (Note that regardless of the tachometer signal type (discussed above), the tachometer signal is used to calculate zero crossing times.) Generally, the output of a tachometer, such as tachometer sensor 104, is a zero crossing time (ZCT), for each tooth/target. The shaft rate is the inverse derivative of the ZCT. In application, the effect of jitter on the measured zero crossing time is inversely proportional to the derivative of the zero crossing time (dZCT) and the pulses per revolution (ppr) as shown in Equation 3 (below).

Accordingly, if jitter is assumed to be a zero mean Gaussian process with some standard deviation, σ, then the variance in shaft rate will be proportional to $\sqrt{2}\sigma$ (this is because the shaft rate is a derivative, e.g., the difference in two ZCT).

$$\text{shaft rate} = 1/dZCT/PPR \quad \text{(Eq. 3)}$$

For the purposes of obtaining jitter effect, the variance in the jitter is added. For example, if one assumes that there is an 8 pulse per revolution (ppr) target on a 30 Hz shaft, the ZCT time between each pulse is nominally 0.0042 seconds. Thus the jitter in the tachometer signal, due to errors in manufacturing and electoral noise, is about 0.0001 seconds, which translates into a standard deviation of the shaft rate of about 0.14 Hz. Accordingly, for one revolution of the component under observation, the phase jitter is: 2π×0.14/30 Hz or about 0.029 radians per revolution. For a 32 tooth gear, the phase error, per revolution, would be 0.94 radians.

To put exemplary numbers to this problem, for a sample rate of 97656 samples per second, the length of the TSA is: $2^{ceil(97656/30)}=4096$ points. This means that for a soft/broken tooth, in which the impact should be in a given bin, the jitter effects that bin index by +/–19 bins or about 68% of the time. Hence, without jitter removal, the TSA has become much less effective and all subsequent analysis is substantially flawed.

At step 208, the jitter is removed using a filtering technique suitable for the application and system. However, typically assessing and removing the jitter from the tachometer signal is necessarily done quickly so as to be useful for real time processing on a health and usage monitoring systems (HUMS), which generally precludes the use of traditional filtering techniques that unsuccessfully address phase discontinuity or lag associated with the filtered tachometer signal and take too long computationally. For example, traditional Finite Impulse Response (FIR) filters have an order of operation of $n^2$, and a phase delay of n/2, where n is the number of filter coefficients. For a filter with a normalized passband of 0.05 and a stopband of 0.1, an FIR filter would have an order of 101, whereas an equivalent Infinite Impulse Response (IIR) filter would have an order of 15. For an application the FIR filter order of operations is 10201 vs. the IIR filter order of operation of 225—in other words, the IIR is 45 times faster. Thus, for certain applications, such as embedded real time systems, the FIR filter requires too much computation to be of much use.

In an exemplary embodiment, process 200 uses an Infinite Impulse Response (IIR) filter to remove jitter from the tachometer signal. In general, this class of filter requires far fewer coefficients to achieve a given bandwidth when compared to the FIR filter (as noted above). While the phase of the IIR filter is non-linear, by running the filter forward then backward in time, the phase cancels (e.g., it is a zero phase filter), with the benefit of improving the noise rejection/jitter of the tachometer signal.

The IIR filter is described in Equation 4 as a linear polynomial:

$$a[1]*Y[i]+a[2]Y[i-1]+\ldots+a[n+1]Y[n]=b[1]X[i]+b[2]X[i-1]+\ldots+b[m+1]X[m] \quad \text{(Eq. 4)}$$

Where:
a are the feedback filter coefficients;
n is the feedback filter order;
Y is the output signal;
b are the feedforward filter coefficients;
m is the feedforward filter order; and
X is the input signal.
The frequency response of the transfer function is then defined in Equation 5 as:

$$H(e)^{jw} = \frac{B(e)^{jw}}{A(e)^{jw}} = \frac{b[1]+b[2]e^{-jw}+\ldots+b[m+1]e^{-jmw}}{a[1]+a[2]e^{-jw}+\ldots+a[n+1]e^{-jnw}} \quad \text{(Eq. 5)}$$

Equation 5 can be used to calculate the bandwidth of the IIR filter.

In certain situations, it may be desired to further minimize the computation order of the filter. In those cases, process 200 can proceed to step 212 where a single pole IIR can be implemented. The single pole IIR is then applied, at step 216, to the pseudo derivative of the tachometer zero crossing times. Furthermore, because the single pole IIR filter is run forwards and backwards in time, the transfer function is the conjugate square for any given set of filter coefficients, thus for example, where a=[1–0.9], b=1–a=0.1, the transfer function is simplified to Equation 6:

$$H(e)^{jw} = \frac{0.01}{1 - 1.81e^{-jw} + 0.81e^{-j2w}} \quad \text{(Eq. 6)}$$

Operationally, the pseudo derivative adds the variance of two zero crossing times: effectively, $\sigma^2$ for zct[i], and $\sigma^2$ for delayed zct[i–1], which is $2\sigma^2$ for variance, and $\sqrt{2}\sigma$ as the standard deviation. Thus, advantageously, the pseudo derivative does not increase the noise of the system by $\sqrt{2}$, as would occur by taking the numerical derivative. Additionally, the pseudo derivative reduces the Gibbs effect (the overshoot of a Fourier series) by having the end points of the zero crossing signal as zero.

In an exemplary embodiment of the disclosed process, at step 216 the pseudo derivative can be generated by assuming the derivative of the shaft speed (e.g., rate of change in the shaft speed) is zero, then the change in time between each zero crossing point is found using Equation 7:

$$dt = (zct[n]-zct[1])/(n-1) \quad \text{(Eq. 7)}$$

Where n is the total number of zero crossings.
If zct[i] is the time of the zero cross at time i, then the pseudo derivative is constructed as shown in Equation 8, for i=1 to n:

$$Dzct[i] = zct[i] - dt*i \quad \text{(Eq. 8)}$$

Then, at step 220, the reduced jitter zero crossing times can be reconstructed by integrating the filtered pseudo derivative as set forth below.
for(i=1 to n){
zct[i]=(z1+dt*(i−1))+spd[i];
}

Example: Wind Turbine High Speed Shaft

Typically, large wind turbines have a main rotor rate of about 0.15 to about 0.25 Hz, or one revolution every four to six seconds. The period of the change of shaft rate is on the order of about 1.3 to about 2 seconds, with the change in rate being due, at least in part, to tower shadow and/or wind shear on the plurality of blades.

Figure 4:
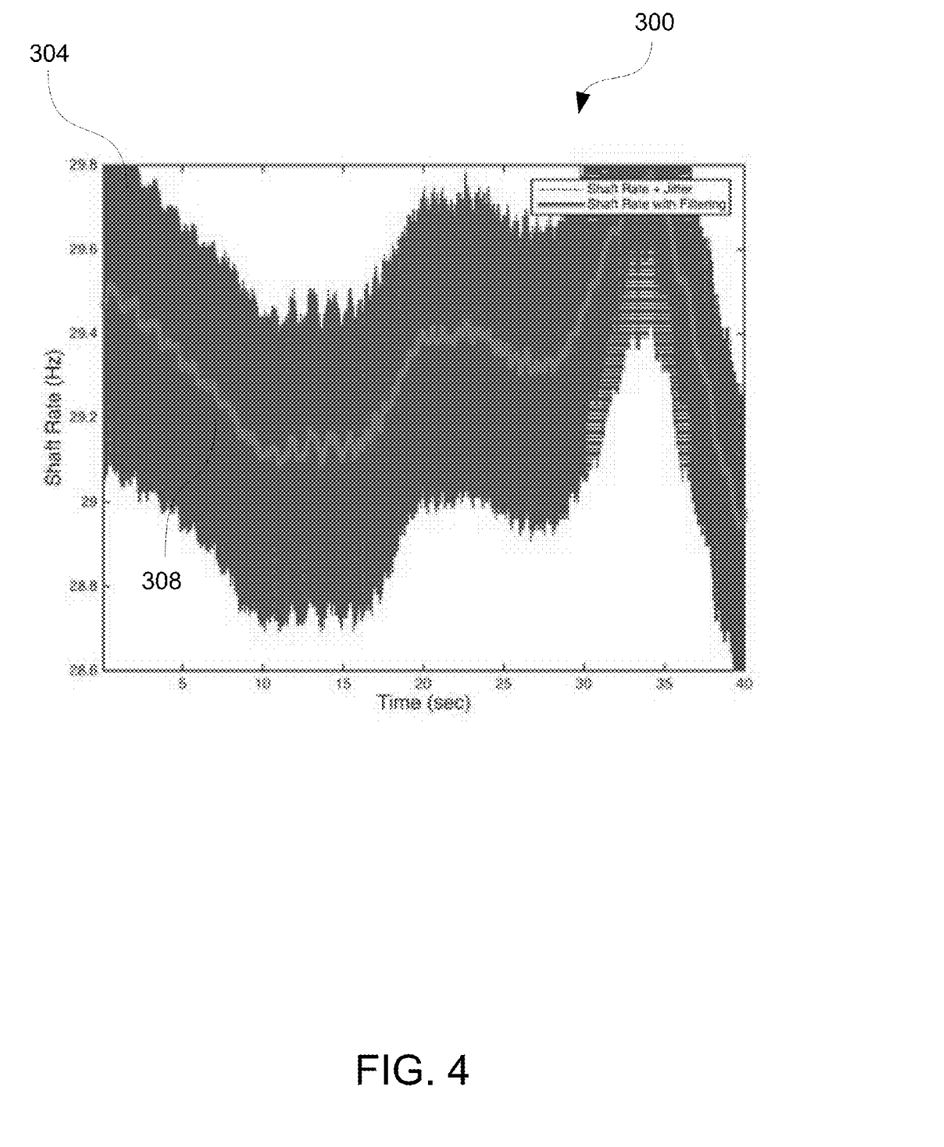
FIG. 4 is a graph showing shaft rate over time for a wind turbine.

FIG. 4 shows a graph 300 of shaft rate measurement over time for the wind turbine shaft of this example. In graph 300, large band 304 is the shaft rate with the jitter included, whereas narrow band 308 is the shaft rate with filtering, as discussed above, performed, i.e., the jitter has been substantially removed from the tachometer signal received from a tachometer sensor, such as tachometer sensor 104.

In this example, the jitter in the tachometer signal resulted from the finite precision of the timer and irregular spacing of the target on the shaft. With the jitter excluded, and as shown in graph 300, narrow band 308 reflects a low order, periodic change in shaft speed characteristic of the effect of tower shaft/wind shear.

Interestingly, this high speed shaft had a known fault: a soft tooth. A comparison of the gear component analysis with jitter and without jitter shows that removing jitter improves the analysis of this fault. This can be quantified by using the population statics of analysis condition indicators (CIs) from a nominal machine vs. the gear defect, then measuring the population's separability. Separability is the statistical distance between two populations and is the normalized distance based on the measurement variance and, advantageously, is a good measure of the ability of a CI to detect a fault (a separability of 3 is approximately a probability of false alarm (PFA) of $10^{-3}$).

Identification of Gear Fault Condition Indicators

There are at least six failure modes for gears: surface disturbances, scuffing, deformations, surface fatigue, fissures/cracks and tooth breakage. Each type of failure mode can generate a different fault signature. Notably, relative to the energy associated with gear mesh frequencies and other noise sources, the fault signatures are typically small. Prior art techniques to identify these different faults are based on the operation of the TSA.

In an exemplary embodiment, the fault is a broken tooth, and the following analyses were conducted (note the gear mesh frequency is found by taking the FFT of the TSA, i.e., taking the absolute value of the number teeth+1 bin):

1. Figure of Merit 0: the TSA peak-to-peak divided by the sum of the 1st and 2nd gear mesh frequencies;

2. Residual Analysis: where shaft order 1, 2, and 3 frequencies and the gear mesh harmonics of the TSA are removed. Faults such as a soft/broken tooth generate 1 per rev impacts in the TSA. In the frequency domain of the TSA, these impacts are expressed as multiple harmonics of the 1 per rev. The shaft order 1, 2, and 3 frequencies and gear mesh harmonics in the frequency domain set to zero, and then the inverse FFT is performed, allowing the impact signature to become prominent in the time domain. Condition indicators (CIs) are statistics of this waveform (Root Mean Square (RMS), Peak 2 Peak (P2P), Crest Factor (CF), Kurtosis).

3. Energy Operator (EO): which is a type of residual of the autocorrelation function. For a nominal gear, the predominant vibration is gear mesh. Surface disturbances, scuffing, etc., generate small higher frequency values which are not removed by autocorrelation. Formally, the EO is: TSA2:n−1×TSA2:n−1×−TSA1:n−2×TSA3:n. The bold indicates a vector of TSA values. The CIs of the EO are the standard statistics of the EO vector 4. Narrowband Analysis (NB): operates on the TSA by filtering out all frequencies except that of the gear mesh and within a given bandwidth. It is calculated by zeroing bins in of the Fourier transform of the TSA, except the gear mesh. The bandwidth is typically 10% of the number of teeth on the gear under analysis. For example, a 23 tooth gear analysis would retain bins 21, 22, 23, 24, and 25, and their conjugates in frequency domain. Then the inverse FFT is taken, and statistics of waveform are taken. Narrowband analysis can capture sideband modulation of the gear mesh frequency due to misalignment or a cracked/broken tooth.

5. Amplitude Modulation (AM) analysis is the absolute value of the Hilbert transform of the narrowband signal. For a gear with minimum transmission error, the AM analysis feature should be a constant value. Faults will greatly increase the kurtosis of the signal.

6. Frequency Modulation (FM) analysis is the derivative of the angle of the Hilbert transform of the narrowband signal. FM analysis is capable of detecting changes of phase due to uneven tooth loading, which is a characteristic of a number of fault types.

Separability Result:

| Analysis: | With Jitter, | Jitter Removed | % Improvement |
|---|---|---|---|
| Residual RMS | 9.65 | 9.83 | 2% |
| Residual Kurt | 17.4 | 19.3 | 9.9% |
| Residual P2P | 14.82 | 16.19 | 9.2% |
| Residual CF | 6.11 | 7.91 | 26% |
| EO Kurtosis | 8.32 | 10.14 | 21.9% |
| FM0 | 8.67 | 9.05 | 5% |
| NB CF | 2.51 | 3.08 | 22% |
| AM RMS | 31.24 | 34.9 | 10% |
| FM RMS | 5.58 | 5.65 | 1% |
| FM Kurtosis | 15.4 | 16.01 | 4% |

In general, there is an improvement in separability when jitter is removed and in some instances an increase of 10 to over 25% when jitter is removed.

For a condition monitoring system where the CI are transformed into a Health Indicator (HI), removing jitter can result in a large improvement in performance. In general, the HI is a function of CI distribution, where a whitening linear transform is used to map the CIs and to the HI. The whitening process is important because it ensures that the operational probability of false alarm (PFA, e.g., the rate of false alarms seen in the field data), is the same as the system designed PFA. The scale and offsite of the transform are based on a generalized function of distribution technique. This transform constructs an HI such that:

The probability of a nominal component having an HI greater than about 0.5 is less than about 10e-6, e.g., PFA is 1-10e-6.

That when the HI is greater than about 0.75 and less than about 1.0, the component is in warning (plan on scheduling maintenance), and That when the HI is greater than about 1.0, continued operations could result in collateral damage to the gearbox or degradation in system performance.

In the instance of a 25% increase of separability, as achieved through jitter reduction, a machine operator would be alerted to scheduling maintenance (0.75 HI level), where other systems not controlling for jitter would still show a nominal component.

Example 2: High Speed Input Shaft

In this example the tachometer sensor is measuring a 3 per revolution coupling on the high speed shaft of a helicopter gearbox. The bracket is soft, such that the imbalance of the input shaft is causing the bracket to vibrate. Thus, the change in displacement of the tachometer sensor relative to the shaft coupling is a source of jitter (shaft rate over time shown in graph 400 shown in FIG. 5, signal with jitter 404 and signal without jitter 408).

Figure 5:
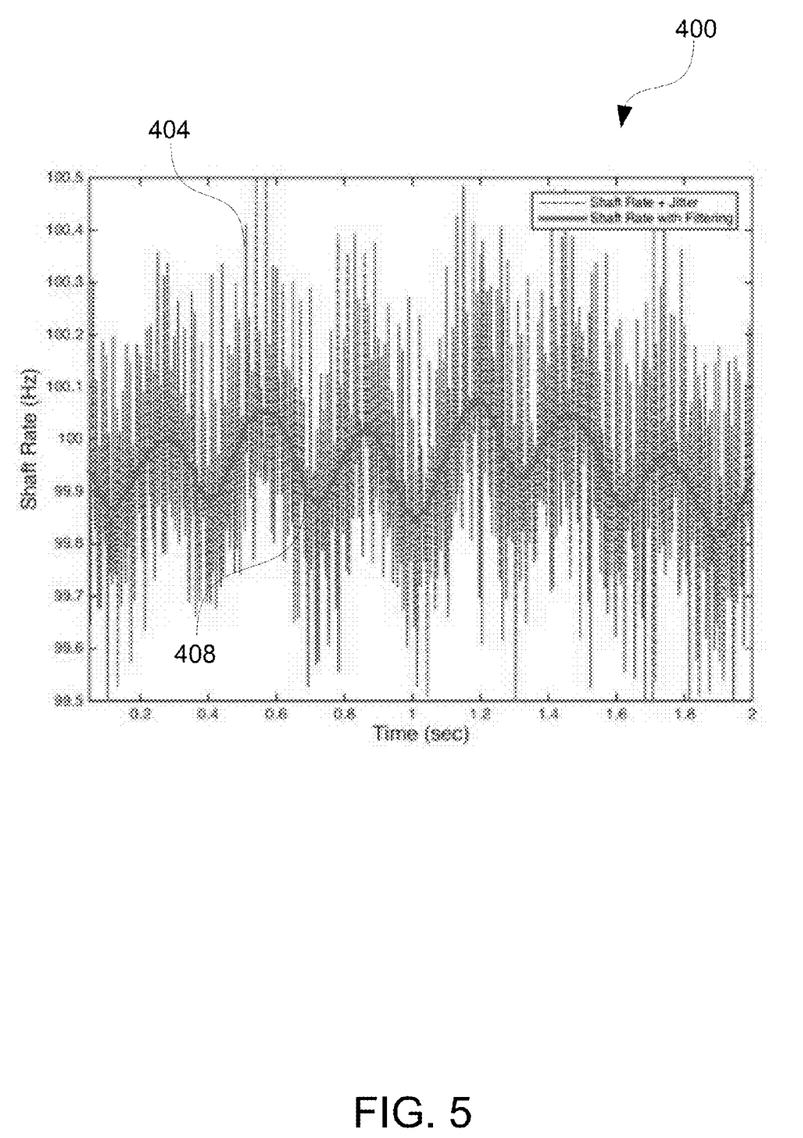
FIG. 5 is a graph showing shaft rate over time for a high speed shaft example.

As shown in FIG. 5, there is an underlying 2 to 3 Hz control loop causing a change in shaft rate of approximately 0.07 Hz. Because the shaft rate, and the resulting tachometer signal, is time varying, in this embodiment tachometer signal should be resampled to accurately determine the cause of the jitter. In an exemplary embodiment, cubic spline interpolation is used.

Figure 6:
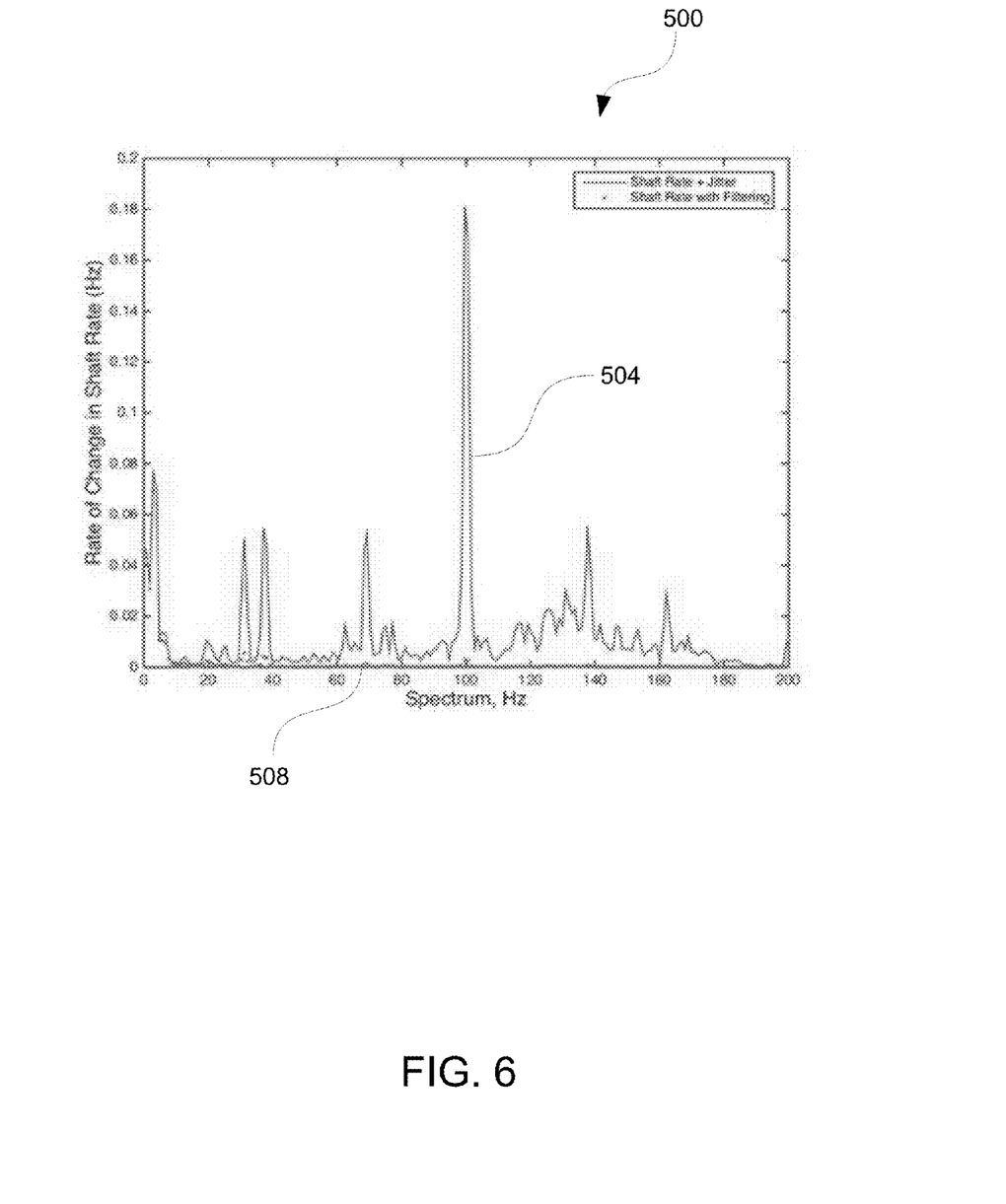
FIG. 6 is a graph of the change in shaft rate (Hz) over spectrum (Hz) for a high speed shaft example.

FIG. 6 is a graph 500 of the change in shaft rate (Hz) over spectrum (Hz)—also referred to as a cubic spline—with a shaft rate with jitter 504 and a shaft rate without jitter 508. Graph 500 can be used to interpolate the tachometer time to an apparent delta time of 0.001 second (e.g., the interpolated sample rate is 1000 Hz). A shown, the predominant cause of the jitter in this example is at about 100 Hz (correlates to a 0.18 Hz change in shaft rate due to jitter), which is associated with the gearbox input shaft rate.

In this example, there are 31.25 Hz sidebands (69.75 and 131.25 Hz, with a value of 0.06 Hz change in shaft rate), which is likely a result of the tachometer sensor bracket resonance. The control loop change in shaft rate (FIG. 5) can now be quantified as 2.93 Hz with a 0.075 Hz change in shaft rate, as shown in FIG. 6.

As discussed above, it is desirable to ensure a zero phase change as a result of removing jitter. With the spline interpolated tachometer signal, it is possible to compare the effect of filtering on the 2.93 Hz control loop, which is a feature that should remain in the tachometer signal. The phase angle of the control loop is the arctangent of the ratio of the imaginary to real Fourier transform, evaluated at the frequency of interest. The phase for the unfiltered tachometer signal is, in this example, 347.1535 degrees, while the phase of tachometer signal with the jitter removed is 347.192. The difference of 0.3% between the two aforementioned values can be attributed to the relatively short signal (2000 points) and noise, and will not affect the performance of the TSA or TSR.

Optimal Selection of the Filter Coefficient for Jitter Reduction

Every mechanical system has a bandwidth that represents the frequency at which half (e.g., 3 dB) of the signal is removed. For example, as shown in FIG. 5, the control loop bandwidth is 3 Hz. This is a feature that should remain in the tachometer signal, as it is not associated with jitter. For this example, the bandwidth of the filter for jitter removal should be 3 Hz/100 Hz, or greater than 3%.

The relationship between the filter coefficients b and a in Eq. 3 (above) is that b=1−a, such that Eq. 3 can now be written as Equation 9, below:

$$H(e)^{jw} = \frac{b*b}{1 - 2*a*e^{-jw} + a*a*e^{-j2w}} \quad \text{(Eq. 9)}$$

Where:

w is the allowable percent change in shaft speed (say 5% for this example)*π; and j is sqrt(−1)

Figure 7:
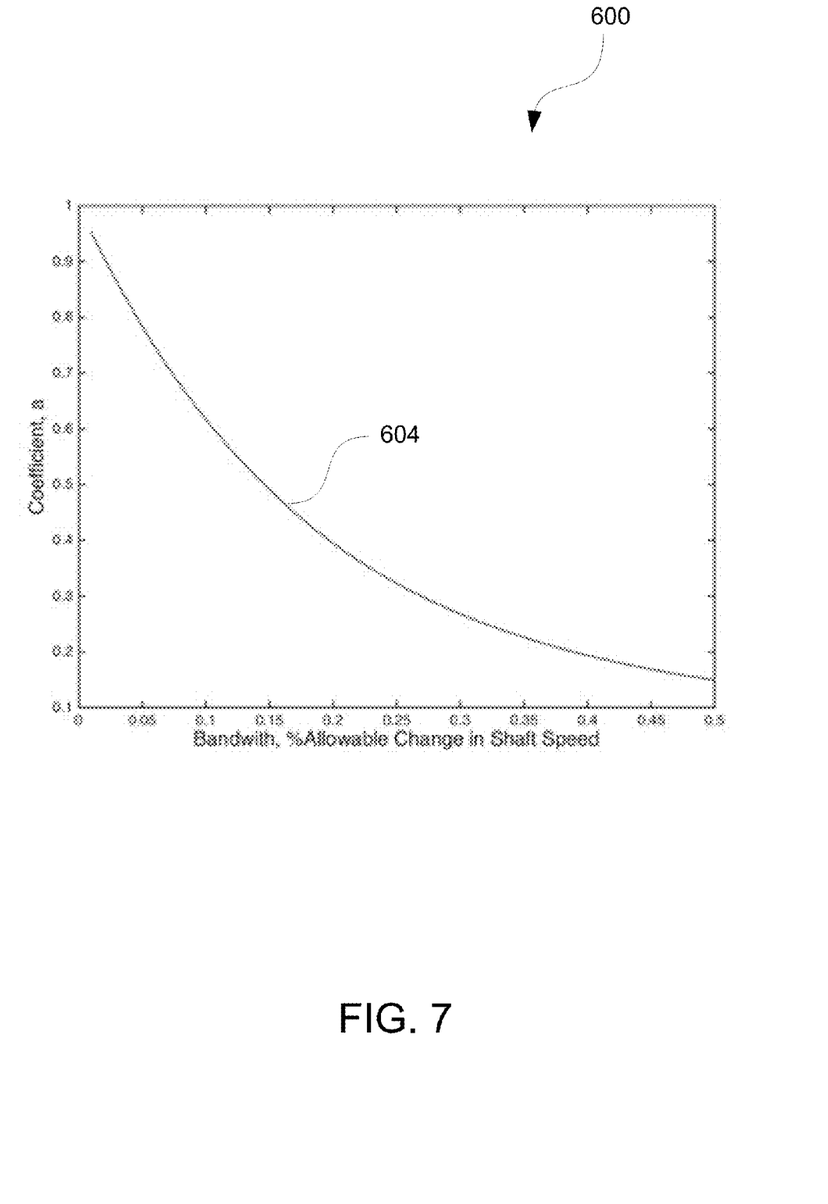
FIG. 7 is a graph of the filter coefficient, a, over bandwidth for a high speed shaft example.

Equation 8 allows for simple Newton-Raphson optimization techniques to be used to solve for the filter coefficient a by setting the target value of −3 dB, with the objective function being (−3 dB−abs(H(e)$^{jw}$)$^2$. For the Newton-Raphson to converge, the objection function must be continuous and a derivative must exist, which this function supports. Using the optimizer procedure, the coefficient value of a can be found for any bandwidth (as shown by curve 604 in graph 600 of FIG. 7). Thus, for example, for a bandwidth of 0.05, the coefficient a is 0.7837.

Use of an IIR Filter for Online/Real Time Shaft Speed Calculation

Because of the low computational burden, a modified IIR filter technique can be used for online/real time embedded system to determine the shaft rate. This capability is often important for equipment in which it is important to report an over speed condition or for a control system where an over speed requires the machine to be stopped and inspected.

This pseudo code outlines the process for detecting the length of time and maximum value of an over speed:
spd_1=low limit of rotational speed. No analysis is conducted when the shaft is not turning.
time_1=0;
aCoef=0.95;
bCoef=1−aCoef;
overspeed=false;
maxOverSpeed=0;
ppr=pulses per revolution.

When the next tachometer time is received (e.g. next time of the zero cross or rising edge of the tachometer signal):
dt=crt_time−time_1;
if dt>0,
spdt=aCoef*spd_1+bCoef/(ppr*dt);
spd_1=spdt;
end The aforementioned calculation provides an estimate of the shaft rate. Then, the filter response, bandwidth and phase delay can be calculated via Equation 10 as:

$$H(e)^{jw} = \frac{bCoef}{1 - a*e^{-jw}} \quad \text{(Eq. 10)}$$

To trigger an alert and to start measuring the time/intensity of the over speed:
if spdt>max RPM, and overspeed==false, then
overspeed=true
starttimeOverspeed=time;
end
if overspeed==true and spdt>max RPM
if spdt>maxOverSpeed,
maxOverSpeed=spdt;
end
end At the end of the over speed:
if overspeed==true and spdt<normal Speed
endtimeOverspeed=time;
reportMaxOverSpeed=maxOverSpeed;
maxOverSpeed=0;
end For a real time system, the ability to filter helps reduce false alarm rates. The small phase lag introduced by the filter should be greater than about 2 tachometer pulses. As an example, for a 100 Hz shaft with a 19 tooth pinion, the phase delay will be effectively zero for effects that are less than the bandwidth of the system and, for all cases, is less than 1.1 milliseconds.

Figure 8:
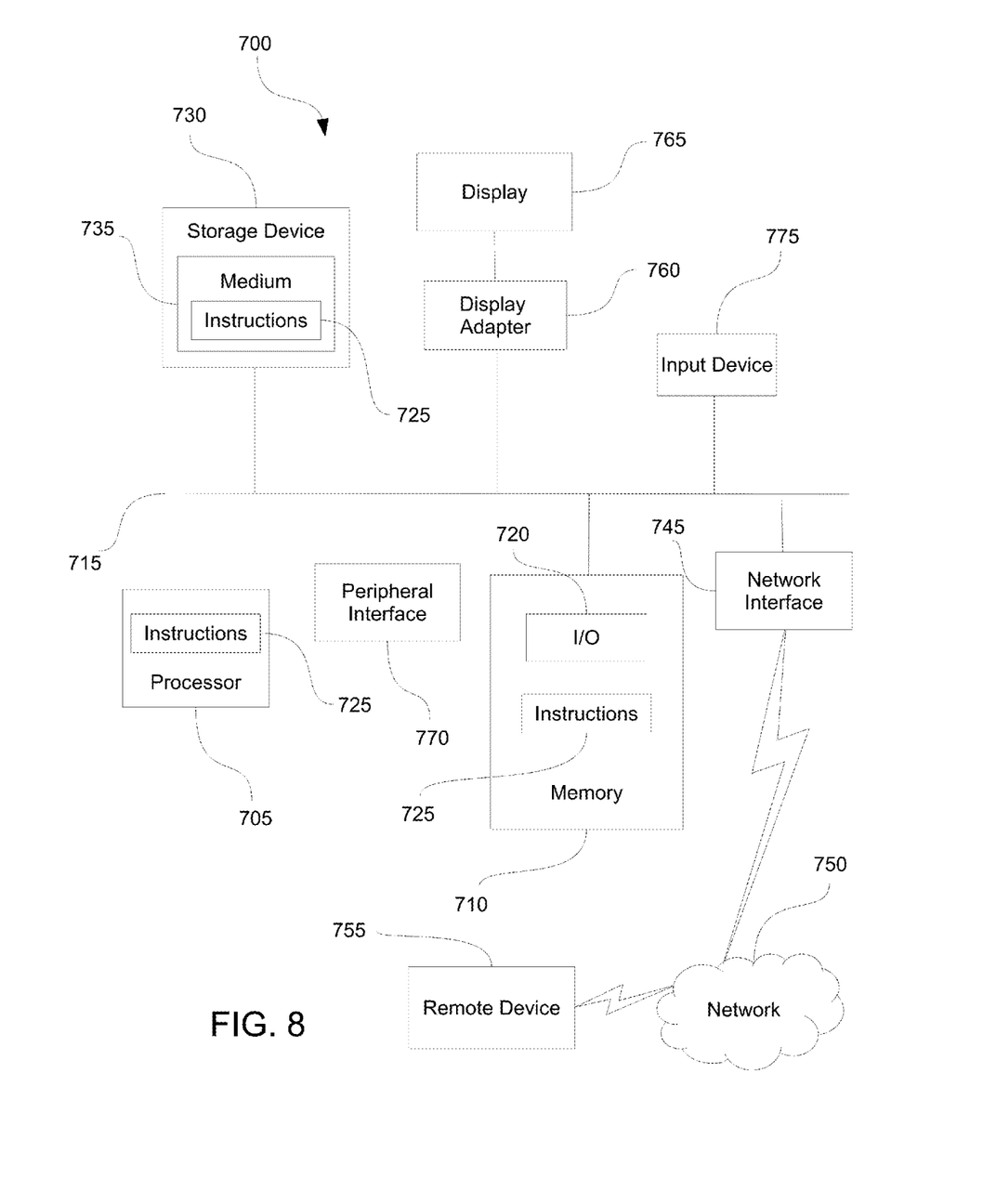
FIG. 8 is a block diagram of a computing system suitable for use with a tachometer signal jitter reduction system according to an embodiment of the present invention.

FIG. 8 shows a diagrammatic representation of one embodiment of a computing device in the exemplary form of a computer system 700 within which a set of instructions for causing a system, such as a tachometer jitter reduction system 100, to perform any one or more of the aspects and/or methodologies of the present disclosure may be executed. It is also contemplated that multiple computing devices may be utilized to implement a specially configured set of instructions for causing the device to perform any one or more of the aspects and/or methodologies of the present disclosure. Computer system 700 includes a processor 705 and a memory 710 that communicate with each other, and with other components, via a bus 715. Bus 715 may include any of several types of bus structures including, but not limited to, a memory bus, a memory controller, a peripheral bus, a local bus, and any combinations thereof, using any of a variety of bus architectures.

Memory 710 may include various components (e.g., machine readable media) including, but not limited to, a random access memory component (e.g., a static RAM "SRAM", a dynamic RAM "DRAM", etc.), a read only component, and any combinations thereof. In one example, a basic input/output system 720 (BIOS), including basic routines that help to transfer information between elements within computer system 700, such as during start-up, may be stored in memory 710.

Memory 710 may also include (e.g., stored on one or more machine-readable media) instructions (e.g., software) 725 embodying any one or more of the aspects and/or methodologies of the present disclosure. In another example, memory 710 may further include any number of program modules including, but not limited to, an operating system, one or more application programs, other program modules, program data, and any combinations thereof.

Computer system 700 may also include a storage device 730. Examples of a storage device (e.g., storage device 730) include, but are not limited to, a hard disk drive for reading from and/or writing to a hard disk, a magnetic disk drive for reading from and/or writing to a removable magnetic disk, an optical disk drive for reading from and/or writing to an optical medium (e.g., a CD, a DVD, etc.), a solid-state memory device, and any combinations thereof. Storage device 730 may be connected to bus 715 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 730 (or one or more components thereof) may be removably interfaced with computer system 700 (e.g., via an external port connector (not shown)). Particularly, storage device 730 and an associated machine-readable medium 735 may provide nonvolatile and/or volatile storage of machine-readable instructions, data structures, program modules, and/or other data for computer system 700. In an exemplary embodiment, storage device 730 is non-transitory storage medium. In one example, software 725 may reside, completely or partially, within machine-readable medium 735. In another example, software 725 may reside, completely or partially, within processor 705.

Computer system 700 may also include an input device 775, such as, but not limited to, tachometer sensor 104. In one example, a user of computer system 700 may enter commands and/or other information into computer system 700 via input device 775. Examples of an input device 775 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), touchscreen, and any combinations thereof. Input device 775 may be interfaced to bus 715 via any of a variety of interfaces (not shown) including, but not limited to, a serial interface, a parallel interface, a game port, a USB interface, a FIREWIRE interface, a direct interface to bus 715, and any combinations thereof. Input device 775 may include a touch screen interface that may be a part of or separate from display 765, discussed further below. Input device 775 may be utilized as a user selection device for selecting one or more graphical representations in a graphical interface as described above. Input device 775 may also include sensors, such as a tachometer sensor as discussed above. The output of the sensors can be stored, for example, in storage device 730 and can be further processed to provide, for example, analysis of the clamp force value over time, by processor 705.

A user may also input commands and/or other information to computer system 700 via storage device 730 (e.g., a removable disk drive, a flash drive, etc.) and/or network interface device 745. A network interface device, such as network interface device 745 may be utilized for connecting computer system 700 to one or more of a variety of networks, such as network 750, and one or more remote devices 755 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 750, may employ a wired and/or a wireless mode of communication. In general, any network topology may be used. Information (e.g., data, software 725, etc.) may be communicated to and/or from computer system 700 via network interface device 745.

Computer system 700 may further include a video display adapter 760 for communicating a displayable image to a display device, such as display device 765. Examples of a display device include, but are not limited to, a liquid crystal display (LCD), a cathode ray tube (CRT), a plasma display, a light emitting diode (LED) display, and any combinations thereof. Display adapter 760 and display device 765 may be utilized in combination with processor 705 to provide a graphical representation of a utility resource, a location of a land parcel, and/or a location of an easement to a user. In addition to a display device, a computer system 700 may include one or more other peripheral output devices including, but not limited to, an audio speaker, a printer, and any combinations thereof. Such peripheral output devices may be connected to bus 715 via a peripheral interface 770. Examples of a peripheral interface include, but are not limited to, a serial port, a USB connection, a FIREWIRE connection, a parallel connection, and any combinations thereof.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system of monitoring a rotating component comprising:
    a tachometer sensor coupled to the rotating component so as to produce a tachometer signal representative of the speed of rotation of the rotating component;

a controller electronically coupled to the tachometer so as to receive the tachometer signal, the control system including a processor and a set of instructions, the set of instructions including:
 determining an effect of jitter on the tachometer signal; and
 removing the amount of jitter from the tachometer signal using a filter.

2. A system according to claim 1, wherein the determining the effect is performed using a tachometer signal zero crossing time.

3. A system according to claim 2, wherein the effect of jitter is presumed to be a zero mean Gaussian process.

4. A system according to claim 1, wherein the filter is an infinite impulse response filter.

5. A system according to claim 4, wherein the filter is run so as to be a zero phase filter.

6. A system according to claim 4, wherein the filter is a single pole infinite impulse response filter.

7. A system according to claim 6, wherein the single pole infinite impulse response filter is applied to a pseudo derivative of the tachometer zero crossing time.

8. A system according to claim 7, wherein the pseudo derivative is generated by determining the change in time between successive tachometer zero crossing times.

9. A system according to claim 1, further including, with the set of instructions, identifying tachometer signal variations unrelated to jitter.

10. A system according to claim 9, wherein the identifying is completed by integrating the filtered pseudo derivative of the zero crossing time.

11. A system according to claim 1, wherein the removing results in increase separability for an analysis of condition indicators.

12. A system according to claim 1, wherein the filter includes a filter coefficient and wherein the filter coefficient is determined using an objective function that is continuous and has a derivative.

* * * * *

UNITED STATES PATENT AND TRADEMARK OFFICE
CERTIFICATE OF CORRECTION

PATENT NO.        : 9,778,281 B1                     Page 1 of 1
APPLICATION NO.   : 15/293188
DATED             : October 3, 2017
INVENTOR(S)       : Eric Robert Bechhoefer It is certified that error appears in the above-identified patent and that said Letters Patent is hereby corrected as shown below:

In the Specification

Column 1, Line 8, replace "2016" with --2015--

Column 3, Line 57, replace "to for remove" with --to remove jitter--

Column 9, Line 58, replace "Equation 8" with --Equation 9--

Column 9, Line 64, replace "the value of a can" with --the value of coefficient $\alpha$ can--

Signed and Sealed this
Twenty-seventh Day of March, 2018

Andrei Iancu
*Director of the United States Patent and Trademark Office*